United States Patent
Casey et al.

(10) Patent No.: US 12,316,109 B2
(45) Date of Patent: May 27, 2025

(54) ELECTRICAL POWER GRID VISUALIZATION

(71) Applicant: X Development LLC, Mountain View, CA (US)

(72) Inventors: Leo Francis Casey, San Francisco, CA (US); Raymond Daly, Palo Alto, CA (US); Peter Evans, Los Altos Hills, CA (US); Amanda McNary, Redwood City, CA (US); Page Furey Crahan, San Francisco, CA (US); Elena Jordan Kohl, Palo Alto, CA (US); Alec Bradford Burch, San Francisco, CA (US); Benjamin Lichtner, San Francisco, CA (US); Alan Lowe McConchie, San Francisco, CA (US); Dhananjay Anant Dixit, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 292 days.

(21) Appl. No.: 17/791,591

(22) PCT Filed: Jan. 14, 2021

(86) PCT No.: PCT/US2021/013392
§ 371 (c)(1),
(2) Date: Jul. 8, 2022

(87) PCT Pub. No.: WO2021/146392
PCT Pub. Date: Jul. 22, 2021

(65) Prior Publication Data
US 2023/0044973 A1 Feb. 9, 2023

Related U.S. Application Data

(60) Provisional application No. 62/961,460, filed on Jan. 15, 2020.

(51) Int. Cl.
*H02J 13/00* (2006.01)
*G06Q 50/06* (2012.01)

(52) U.S. Cl.
CPC ........ *H02J 13/00001* (2020.01); *G06Q 50/06* (2013.01)

(58) Field of Classification Search
CPC .............................................. H02J 13/00001
See application file for complete search history.

(56) References Cited

U.S. PATENT DOCUMENTS

| 6,941,359 B1 | 9/2005 | Beaudoin et al. |
| 7,860,702 B1 | 12/2010 | Evans et al. |

(Continued)

FOREIGN PATENT DOCUMENTS

| CN | 101676852 | 3/2010 | |
| CN | 105302057 A * | 2/2016 | ........... G05B 19/056 |

(Continued)

OTHER PUBLICATIONS

International Preliminary Report on Patentability in International Appln. No. PCT/US2021/013392, dated Jul. 19, 2022, 8 pages.

(Continued)

*Primary Examiner* — Suresh Suryawanshi
(74) *Attorney, Agent, or Firm* — Fish & Richardson P.C.

(57) ABSTRACT

Methods, systems, and apparatus are disclosed for electrical power grid visualization. A computer-implemented method includes: obtaining power grid data including different temporal and spatially dependent characteristics of a power grid, the characteristics including a first characteristic, a second characteristic, and a third characteristic; and generating a graphical user interface (GUI) representing a visualization of the power grid data. The GUI includes a line-diagram representation of power lines in the power grid overlaid on a map of a geographic region in which the power grid is (Continued)

located, the line-diagram including a plurality of line segments, wherein attributes of each line segment represent the power grid data at a particular spatial location of the power grid. The attributes include a time-changing thickness of the line segment representing the first characteristic; a plurality of time-changing directional arrows on the line segment representing the second characteristic; and a color shading representing the third characteristic.

20 Claims, 14 Drawing Sheets

(56) References Cited

U.S. PATENT DOCUMENTS

| | | | |
|---|---|---|---|
| 8,583,405 B2 * | 11/2013 | Chow | G06Q 10/063 702/182 |
| 8,947,433 B2 | 2/2015 | Bak et al. | |
| 9,000,943 B2 | 4/2015 | Prosser et al. | |
| 2016/0224301 A1 * | 8/2016 | Castelli | G06F 3/0486 |
| 2018/0129768 A1 * | 5/2018 | Enenkel | H02J 13/00017 |

FOREIGN PATENT DOCUMENTS

| | | | | |
|---|---|---|---|---|
| CN | 108563898 A | * | 9/2018 | G06F 30/18 |
| JP | 2012186892 | | 9/2012 | |
| WO | WO 2015/092911 | | 6/2015 | |
| WO | WO 2017/171734 | | 10/2017 | |

OTHER PUBLICATIONS

International Search Report and Written Opinion in International Appln. No. PCT/US2021/013392, dated May 3, 2021, 11 pages.

Office Action in European Appln. No. 21704995.6, mailed on Mar. 10, 2025, 11 pages.

* cited by examiner

ELECTRICAL POWER GRID VISUALIZATION

CROSS-REFERENCE TO RELATED APPLICATION

This application is a National Stage Application under 35 U.S.C. § 371 and claims the benefit of International Application No. PCT/US2021/013392, filed Jan. 14, 2021, which claims the benefit of U.S. Application No. 62/961,460, filed Jan. 15, 2020, which is incorporated by reference in its entirety.

BACKGROUND

Electrical power grids transmit electrical power to loads such as residential and commercial buildings. Electrical power grid load is constantly changing in both magnitude and power factor. As the use of variable, often intermittent, renewable supply resources increases, a greater share of supply also changes, independent of load. Due to the growing size, complexity, and variability of electrical power grids, there is a need for an ability to monitor and visualize electrical power grid conditions dynamically as they change over time. Additionally, it is desirable to be able to simulate and visualize various electrical power grid conditions, both together and individually.

SUMMARY

Techniques are described for electrical power grid operation visualization. Electric power delivery system conditions and behavior are the consequence of multiple closely-coupled, constantly changing factors. Electrical load and supply are constantly changing in both magnitude and phase, which can also be expressed as magnitude and power factor. Power system elements dynamically respond to the changes in both load and supply.

The interplay of varying loads and supplies constantly alters characteristics of an electrical power delivery system, including both transmission and distribution. Characteristics of an electrical power grid can include, but are not limited to, voltage, real power, reactive power, power factor, current flow, asset utilization, phase imbalance, and other characteristics. None of these characteristics is wholly independent, as each characteristic affects or is affected by the others. At times these varying characteristics may approach or exceed operating limits in specific locations within the system, prompting remedial action and/or system alterations.

A computer system can collect and display data related to characteristics of an electrical power grid. The computer system can display power grid data in a graphical user interface (GUI). The GUI can include a visualization of the power grid data overlaid on a street-view, satellite, aerial, and/or topological map showing locations of physical components of the power grid. The map can include features near the power grid, e.g., streets, buildings, and vegetation.

The GUI can show characteristics of a power grid dynamically, in real-time, over the course of a given historical time frame, and/or simulated and projected into a future time frame. Visualizations of the power grid data can include various visual elements, e.g., time-changing sizes, color shading, and movement of graphical features. A user can select to view power grid characteristics simultaneously, individually, and in selectable combinations to observe the interconnectedness of the elements.

The GUI can show dynamic characteristics of a power grid within the grid in a map view, in a two-dimensional space-time view, and/or in a plot view. These views can be linked to show power grid characteristics from different perspectives.

In general, innovative aspects of the subject matter described in this specification can be embodied in a computer-implemented method executed by one or more processors, the method including: obtaining power grid data including a plurality of different temporal and spatially dependent characteristics of a power grid, the characteristics including a first characteristic, a second characteristic, and a third characteristic; and generating a graphical user interface (GUI) representing a visualization of the power grid data, the GUI including: a first window that includes a line-diagram representation of power lines in the power grid overlaid on a map of a geographic region in which the power grid is located, the line-diagram including a plurality of line segments. Attributes of each line segment represent the power grid data at a particular spatial location of the power grid, the attributes including: a time-changing thickness of the line segment representing the first characteristic at the particular spatial location of the power grid; a plurality of time-changing directional arrows on the line segment representing the second characteristic; and a color shading of the line segment representing the third characteristic; a second window that includes at least one graph representing values of a characteristic of the power grid over time and space. Each value is represented by respective coordinates on the graph and a shade. For each value of the characteristic an x-coordinate represents a distance of the value from a reference point in the power grid, a y-coordinate represents a time of the value, and the shade of the value represents a magnitude of the value; and a third window that includes a menu including user-selectable icons that permit toggling representation of different characteristics of the power grid on and off within the first window, the second window, or both.

These and other embodiments can include the following features, alone or in combination. In some implementations, the first characteristic of the power grid includes power flow, and the plurality of time-changing directional arrows on the line segment represent a power magnitude and direction of power flow.

In some implementations, power flow includes real power flow and reverse power flow.

In some implementations, the second characteristic of the power grid includes voltage, and the time-changing thickness of the line segment represents a voltage magnitude at the particular spatial location of the power grid.

In some implementations, the menu includes a user-selectable icon that permits changing an aspect of the first window and the second window to present an anomaly view. Attributes of each line segment represent whether the power grid data has crossed a threshold at a particular spatial location of the power grid.

In some implementations, the menu includes one or more user-selectable icons that permit changing an aspect of GUI to present a comparison view. The comparison view includes: a top window that includes a first line-diagram representation of power lines in the power grid, and a first graph representing values of a characteristic of the power grid over time and space, under a first set of conditions; and a bottom window that includes a second line-diagram representation of power lines in the power grid, and a second graph representing values of the characteristic of the power grid over time and space, under a second set of conditions.

In some implementations, the GUI includes one or more user-selectable icons that permit selecting the map underlain in the first window; and the map includes one or more of a topological map, a street-view map, an aerial map, or a satellite map.

In some implementations, in response to a user selecting a coordinate in the second window, the GUI highlights a line segment at a corresponding spatial location in the first window.

In some implementations, in response to a user selecting a coordinate in the second window, the GUI displays the magnitude of a corresponding characteristic value.

In some implementations, in response to a user selecting a spatial location in the first window, the GUI displays power grid data at the spatial location graphed over a period of time.

In some implementations, the third characteristic includes one or more of power factor, feeder utilization, or transformer utilization.

Other implementations of the above aspects include corresponding systems, apparatus, and computer programs, configured to perform the actions of the methods, encoded on computer storage devices. The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

This disclosure generally describes computer-implemented methods, software, and systems for electrical power grid visualization. A computing system can receive various electrical power grid data from multiple sources. Power grid data can include different temporal and spatially dependent characteristics of a power grid. The characteristics can include, for example, power flow, voltage, power factor, feeder utilization, and transformer utilization. These characteristics can be coupled; for example, some characteristics may influence others and/or their temporal and spatial dependence may be related.

Figure 1:
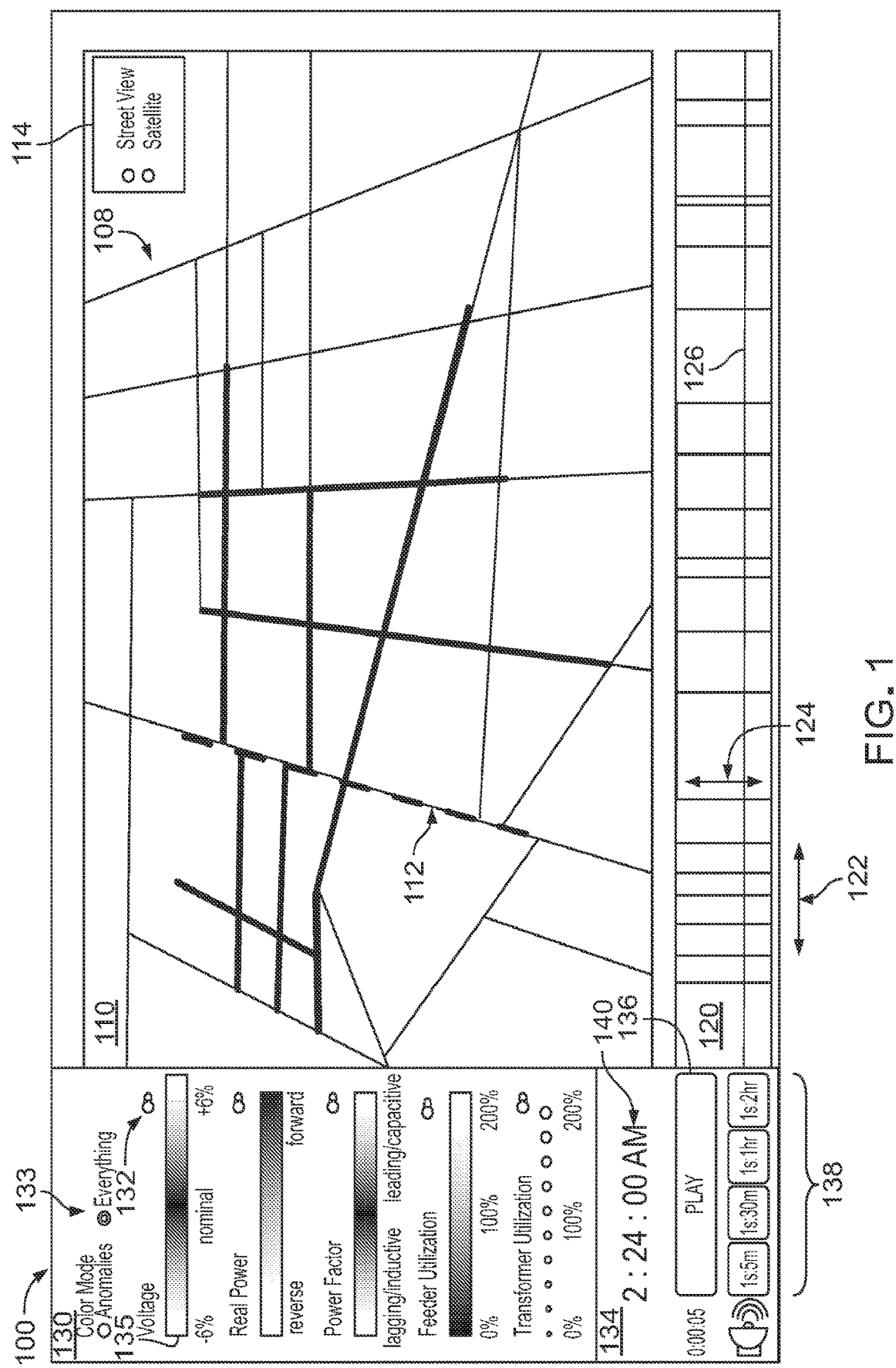
FIG. 1 illustrates an example of a user interface that includes a visualization of power grid data in three windows.
Figure 7:
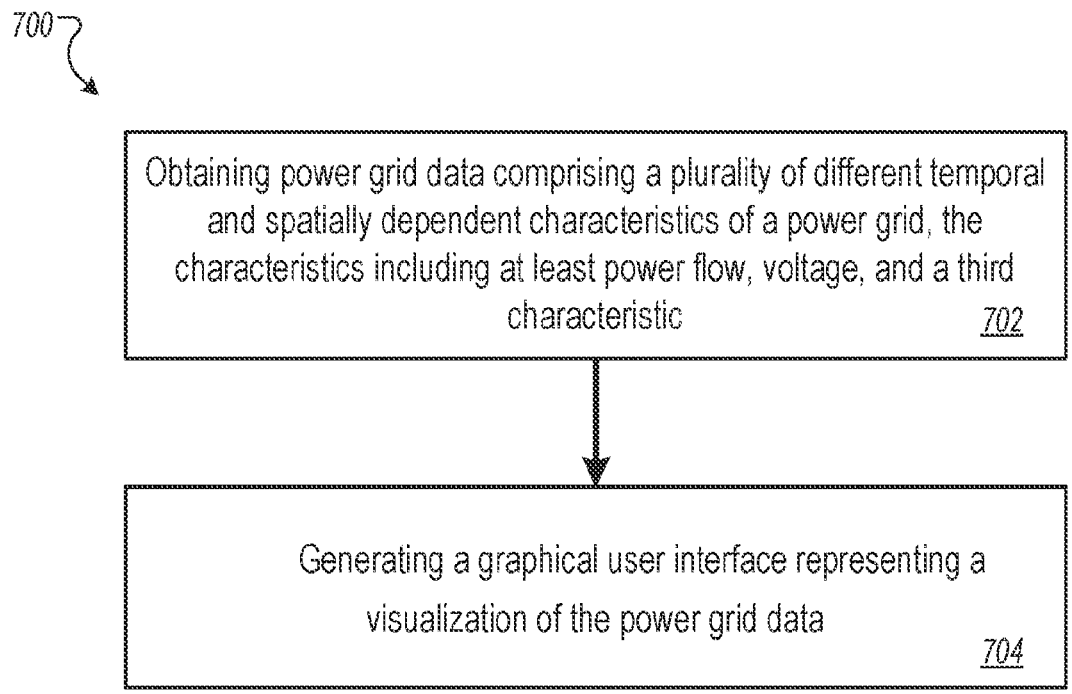
FIG. 7 illustrates an example flow diagram of a process for generating a user interface for power grid visualization.

FIG. 1 illustrates an example of a user interface 100 that includes a visualization of the power grid data in three windows. The user interface 100 can be generated using a process 700, shown in FIG. 7. In some implementations, all or portions of process 700 can be performed on a local computing device, e.g., a desktop computer, a laptop computer, a mobile device such as a smart phone, or a handheld device such as a tablet computer. In some implementations, all or portions of process 700 can be performed on a remote computing device, e.g., a server system, e.g., a cloud-based server system.

The process 700 includes obtaining power grid data including a plurality of different temporal and spatially dependent characteristics of a power grid, the characteristics including at least power flow, voltage, and a third characteristic (702). The power grid can be an electrical power grid that transmits electrical power to loads such as residential and commercial buildings. Example characteristics of the power grid can include real power, reactive power, power factor, current flow, asset utilization, phase imbalance, and other characteristics. Power grid data sources can include satellites, aerial image databases, publicly available government power grid databases, and utility provider databases. The sources can also include sensors installed within the electrical grid by the grid operator or by others, e.g., power meters, current meters, voltage meters, or other devices with sensing capabilities that are connected to the power grid. Data sources can include databases and sensors for both high voltage transmission and low voltage distribution systems.

The data can include, but is not limited to, map data, transformer locations and capacities, feeder locations and capacities, load locations, or a combination thereof. The data can also include measured data from various points of the electrical grid, e.g., voltage, power, current, power factor, and phase balance between lines. In some examples, the data can include historical measured power grid data. In some examples, the data can include real-time measured power grid data. In some examples, the data can include simulated data. In some examples, the data can include a combination of measured and simulated data.

The process 700 includes generating a graphical user interface representing a visualization of the power grid data (704). Referring to FIG. 1, the user interface 100 includes a first window 110. The first window 110 includes a line-diagram representation of power lines in the power grid. The first window 110 can also show representations of other elements of the power grid with the line-diagram. The line-diagram is overlaid on a map 108 of a geographic region. The map 108 of the geographic region is a map of the geographic region in which the power grid is located. The user interface 100 can include a map menu 114. A user can select one or more icons of the map menu 114 in order to view the line-diagram overlaid on a street-view, satellite, aerial, and/or topological map view, or any combination of map views.

The line-diagram includes one or more line segments 112 (illustrated as dashes in one branch of the line diagram). Each line segment can represent a portion of the wires of the power grid. Attributes of each line segment 112 can represent power grid data at a particular spatial location of the power grid. In some implementations, the spatial resolution (and size in pixels) of each line segment can vary to accommodate the spatial resolution of the received power grid data. For example, if power grid data is available at 1000 ft intervals along a 10,000 ft length of feeder line, the GUI can represent that particular length of feeder line with 10 different line segments. The color, shade, width, height, or any combination of these or other attributes of a line segment can indicate one or more characteristics of the power grid at the line segment at a particular point in time. Line segments can also show moving arrows indicating the direction and magnitude of a characteristic of the power grid at the line segment at a particular point in time.

The user interface 100 includes a player 134. The player 134 enables the user interface 100 to show characteristics of the power grid over time. The player 134 includes a "Play" icon 136 that allows the user to play, pause, and resume the display of characteristics of the power grid over time. The player 134 also includes icons 138 that allow the user to select different playback rates. The player 134 also includes a time display 140. The time display 140 displays the time of day of the characteristics of the power grid that are presently shown.

The user interface 100 includes a second window 120. The second window 120 includes at least one graph with an X axis in the direction of arrow 122 and a Y axis in the direction of arrow 124. Each graph can represent values of a characteristic of the power grid over time and space.

Each value of the one or more graphs in the second window 120 can be represented by respective coordinates on the graph and a shade. A shade of the value represents a magnitude of the value. In some examples, the magnitude is an absolute magnitude. In some examples, the magnitude is a relative magnitude. In some examples, data may not be available for all locations of the power grid. Missing data can be represented by a dark or black shading.

For each value of the one or more graphs in the second window 120, an X-coordinate represents a distance of the value from a reference point in the power grid, e.g., a power source, while a Y-coordinate represents a time of the value. A marker 126 perpendicular to the Y axis and moving in the direction of the Y axis marks the time of the values along the marker 126. The time of the values along the marker 126 may also be the time displayed in the time display 140, and the time of the characteristics of the power grid represented in the first window 110.

The user interface 100 includes a third window 130. The third window 130 includes a menu. The menu includes user-selectable icons 132 that permit toggling representation of different characteristics of the power grid on and off. The user can select the icons 132 of the menu in the third window 130 in order to view one characteristic or a selected combination of characteristics in the first window 110 and the second window 120. When a user selects one of the icons 132 to toggle a respective characteristic on, representation of the respective characteristic is displayed within the first window 110, the second window 120, or both.

When a user selects more than one of the icons 132 to toggle a respective combination of characteristics on, representation of the respective characteristics are displayed together within the first window 110, and side-by-side in the second window 120, or both. For example, the representation of the respective characteristics can be displayed spatially and temporally within the first window 110, and side-by-side in the direction of the arrow 122 in the second window 120.

For the user-selectable icons 132 that permit toggling representation of different characteristics of the power grid, the characteristics themselves are represented by different color schemes 135, shown in the third window 130. The magnitude of the value of the characteristics can be represented by shades or gradients. Anomalous values of the characteristics can be represented by different colors or shades.

The third window 130 includes a selector 133 that allows the user to select either all values ("Everything"), or only anomalous values ("Anomalies"). When the user selects "Everything," the toggled-on characteristics of the power grid display by color in the first window 110 and the second window 120 for all values. When the user selects "Anomalies," the toggled-on characteristics of the power grid display by color in the first window 110 and the second window 120, only for values that are not within a programmed limit or threshold.

In some examples, a user can simulate adding and removing assets to the power grid. For example, the user can simulate adding power sources and/or power loads to the power grid. The user interface 100 can display effects of the changing assets on the characteristics of the power grid.

In some examples, a user can input an optimization requirement for adjusting one or more characteristics. The computing system can compute a solution to the optimization requirement and can display simulated characteristics for implementing the solution.

FIGS. 2-6 illustrate example user interfaces showing various power grid characteristics. More specifically, FIGS. 2A and 2B illustrate example user interfaces 200a and 200b, respectively ("user interfaces 200"), each with line segment attributes representing multiple power grid characteristics. The user interfaces 200 each have line segments representing characteristics of voltage, real power, power factor, feeder line utilization, and transformer utilization.

Figure 2A:
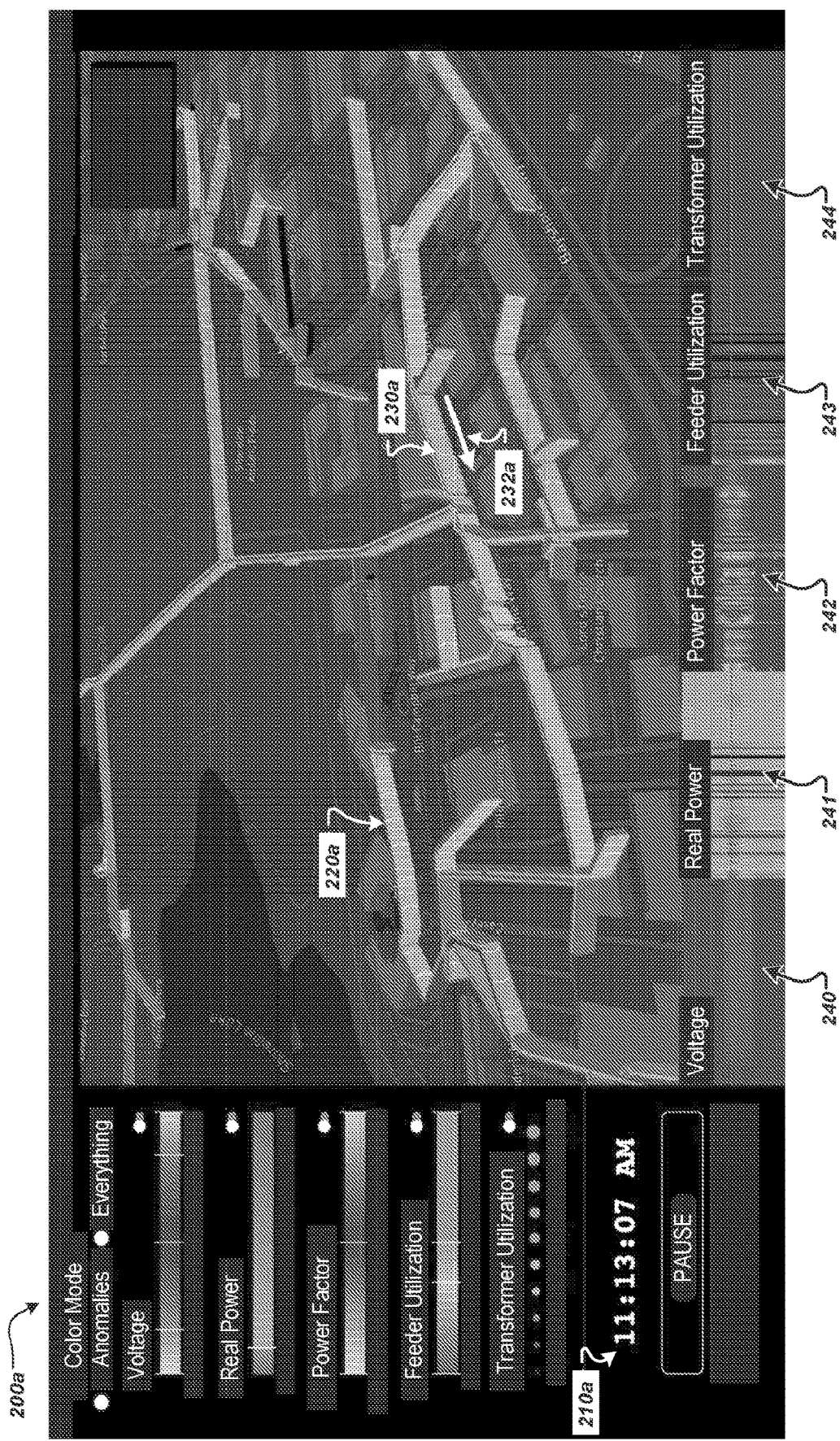
FIGS. 2A and 2B illustrate example user interfaces with line segment attributes representing multiple power grid characteristics.
Figure 2B:
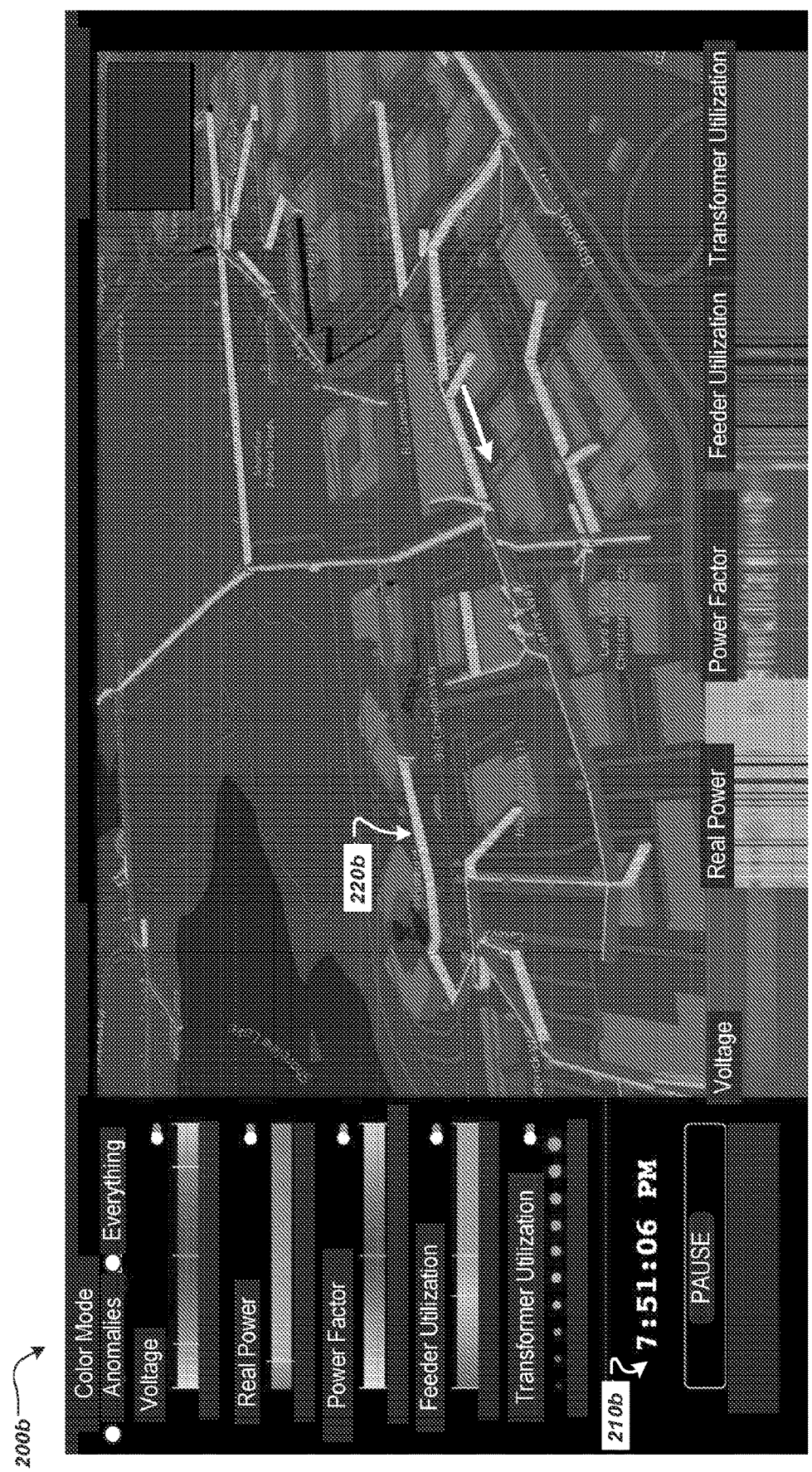

FIG. 2A illustrates an example user interface 200a with line segment attributes representing multiple power grid characteristics at a first time 210a. FIG. 2B illustrates an example user interface 200b with line segment attributes representing multiple power grid characteristics at a second time 210b that is later than the first time.

In the user interfaces 200, relative voltage magnitude is represented by a time-changing thickness of line segments. The time-changing thickness of the line segments can be represented as time-changes in either, or both, the width or the height of the line segment. The thickness of each line segment represents the relative voltage magnitude at a particular spatial location of the power grid at the given time. For example, a line thickness at point 220a represents the relative voltage magnitude at a particular location at the first time 210a. A line thickness at point 220b represents the relative voltage magnitude at the particular location at the second time 210b. The line thickness at point 220b is thinner than the line thickness at point 220a, representing a lower relative voltage magnitude.

In the user interfaces 200, relative power magnitude and direction of power flow are represented by time-changing directional arrows on each line segment. A direction of power flow is represented by a direction of arrows on the line segment. The time-changing arrows progress along each line segment in the direction of power flow. For example, the arrow 230a progresses over time in the direction indicated by arrow 232a.

In the user interfaces 200, a magnitude of a third characteristic is represented by a color shading of each line segment. For example, color shading of each line segment may be green, purple, pink, or yellow. Each shade can represent a relative or absolute magnitude of a characteristic, e.g., power factor or line utilization. The menu in the third window 130 provides a color-coded legend for the color shading of the line segments in the first window 110.

An example third characteristic is power factor. Power factor is a phase offset between real and reactive power. A power factor near a value of one, or unity, is desirable. The user interfaces 200 can represent power factor extending outside a designated range around unity with a line color gradient. Darker shading can represent values near unity, while lighter shading can represent lagging or leading values.

The user interfaces 200 each show five graphs 240-244 in the second window 120. Each graph 240-244 shows values of a single characteristic graphed over space and time. A color shading of each coordinate point on the graphs 240-244 represents an instantaneous value of the characteristic at the corresponding time and location.

Figure 3A:
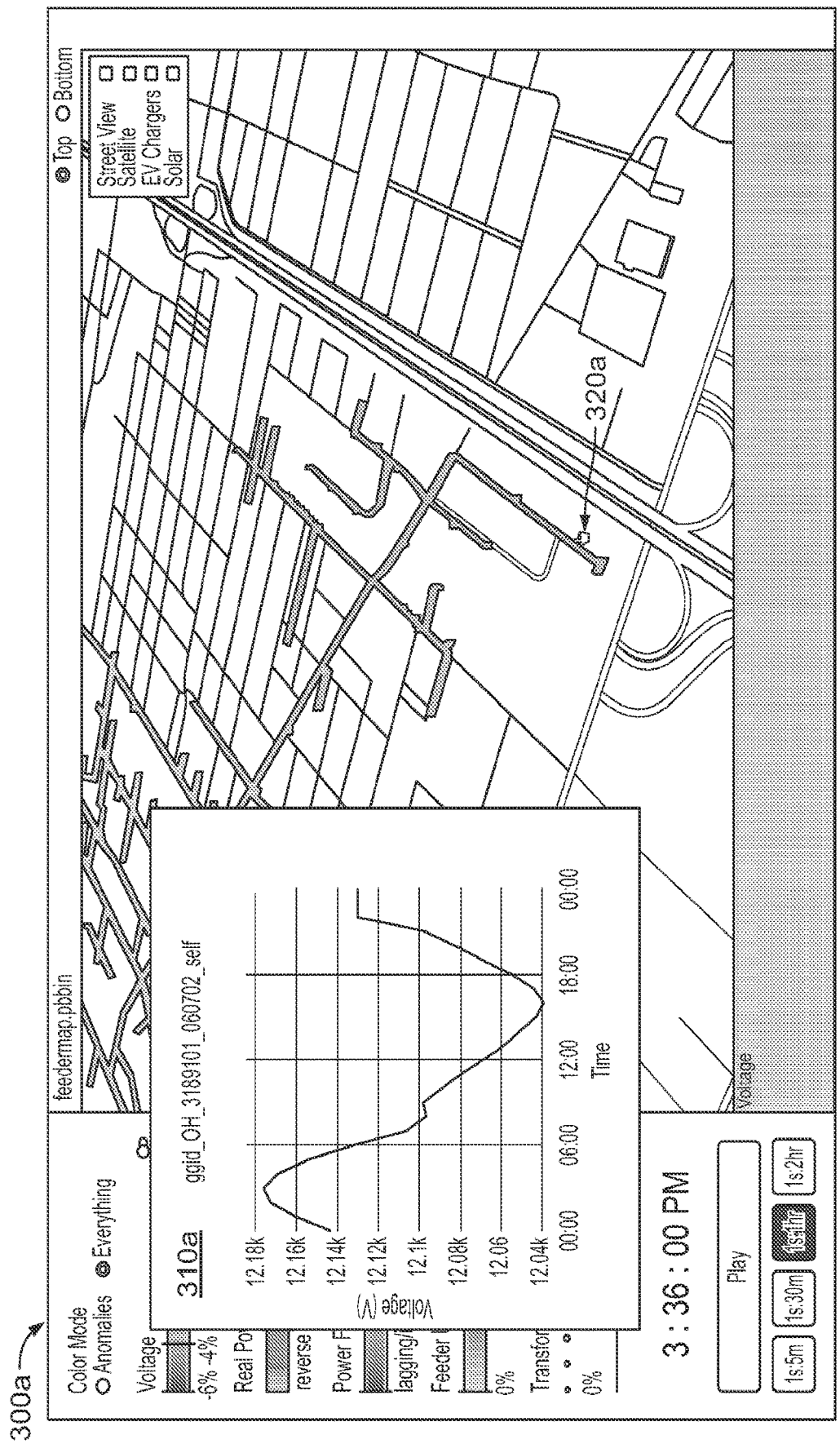
FIGS. 3A and 3B illustrate example user interfaces with line segment attributes representing power grid voltage.
Figure 3B:
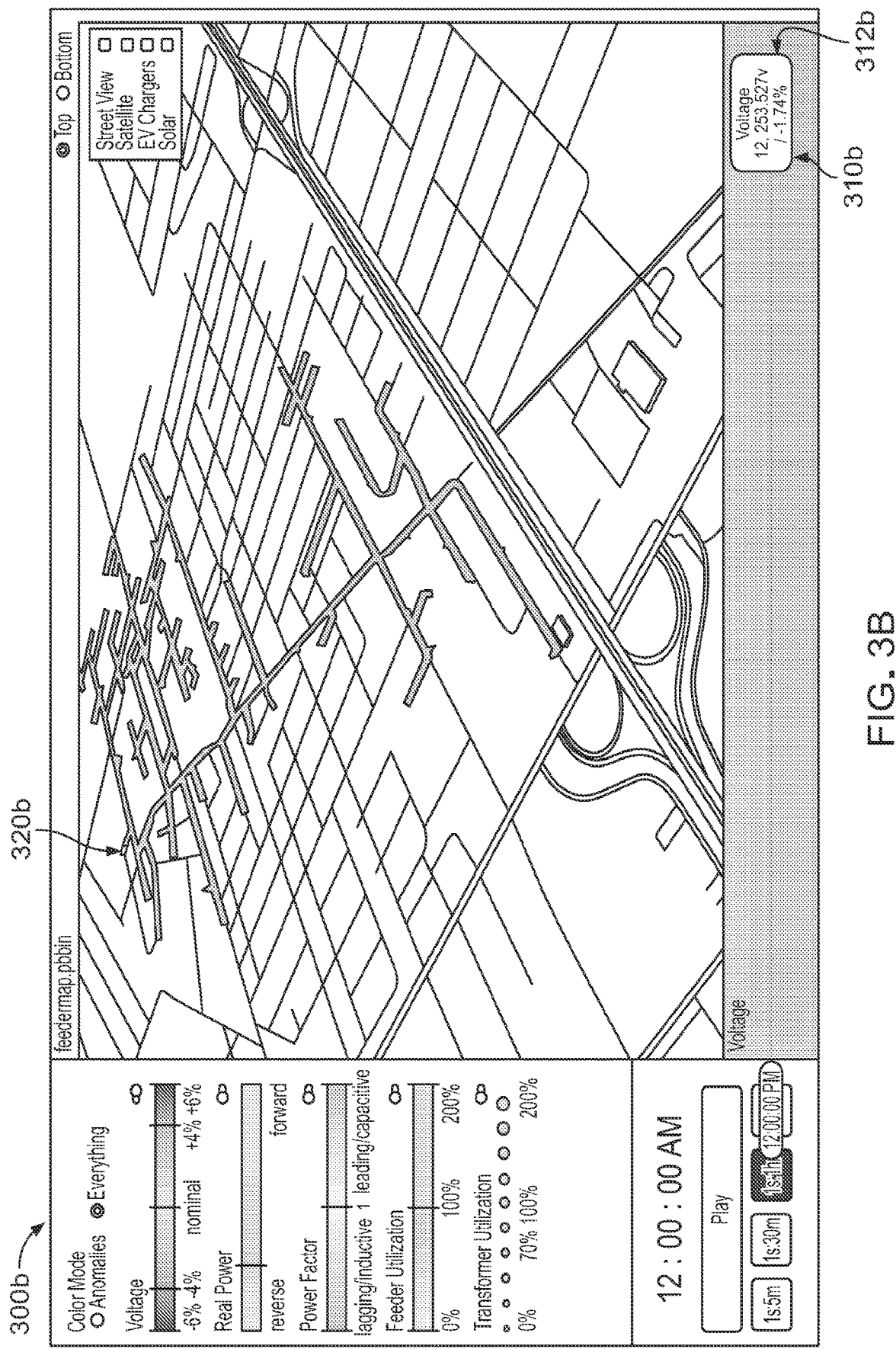

FIGS. 3A and 3B illustrate example user interfaces 300a and 300b, respectively, each with line segment attributes representing power grid voltage. Power grid voltage magnitudes are represented with a line color gradient. A color shading of the line segments can represent a voltage approaching high or low violation conditions.

FIG. 3A illustrates an example user interface 300a with line segment attributes representing power grid voltage, with a detailed voltage graph 310a shown for a selected location 320a. In the user interface 300a, a user has selected the location 320a within the first window 110, using a cursor. In response to the user selecting the location 320a, the user interface shows the voltage graph 310a. The voltage graph 310a shows voltage magnitude at the location 320a graphed over a period of 24 hours.

FIG. 3B illustrates an example user interface 300b with line segment attributes representing power grid voltage, with detailed information 310b shown for a selected time and location 320b. In the user interface 300b, a user has selected a point 312b on a graph in the second window 120 using a cursor. The selected point 312b corresponds to a value of voltage at a location 320b, at a particular time. In response to the user selecting the point 312b, the user interface 300b shows detailed information 310b in the second window 120. The detailed information 310b includes the absolute and relative voltage magnitude at the location 320b at the particular time, in units of both voltage and percentage. Additionally, in response to the user selecting the point 312b, the user interface highlights a line segment in the first window 110 corresponding to the location 320b.

Figure 4A:
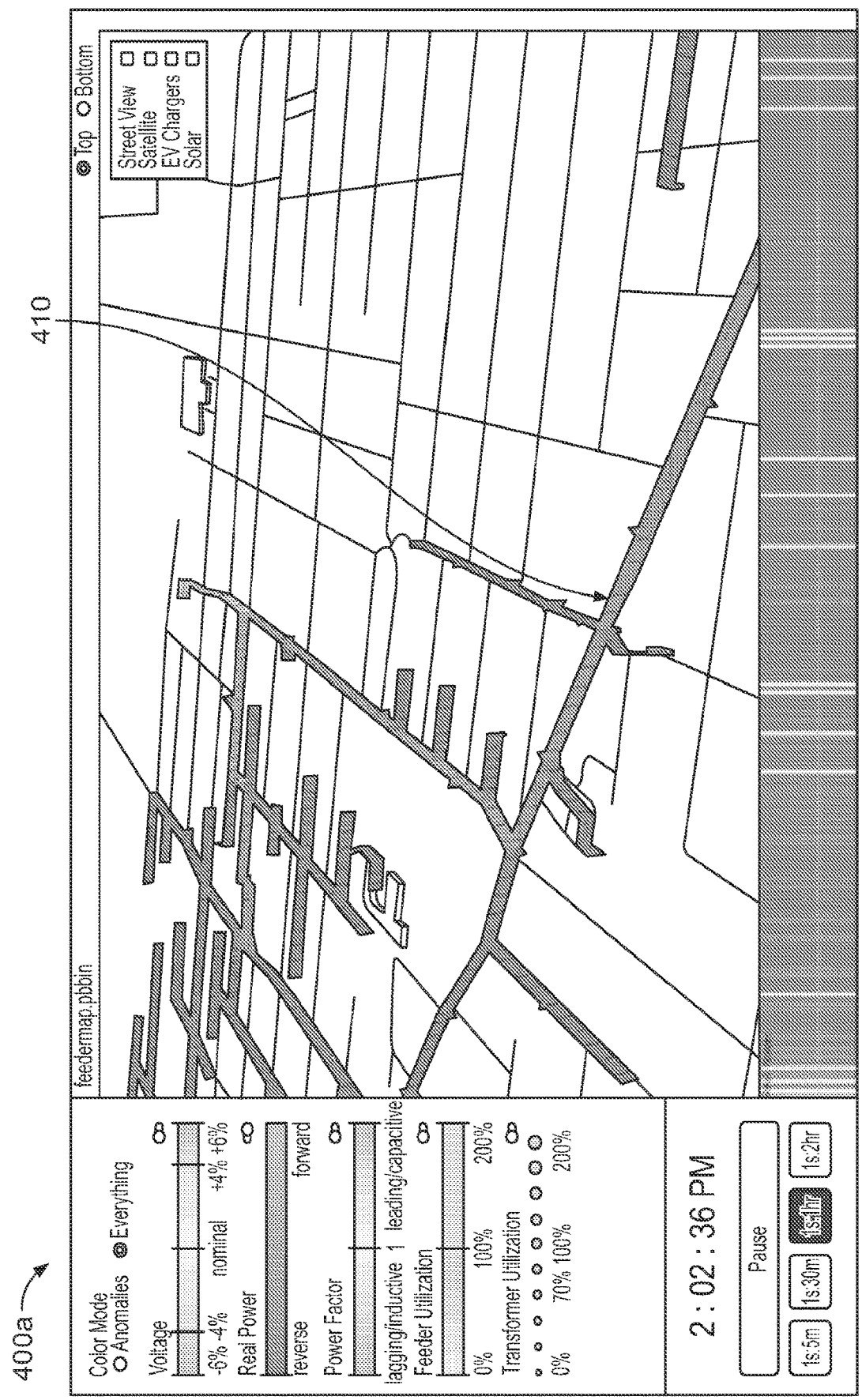
FIGS. 4A and 4B illustrate example user interfaces with line segment attributes representing real power flow.
Figure 4B:
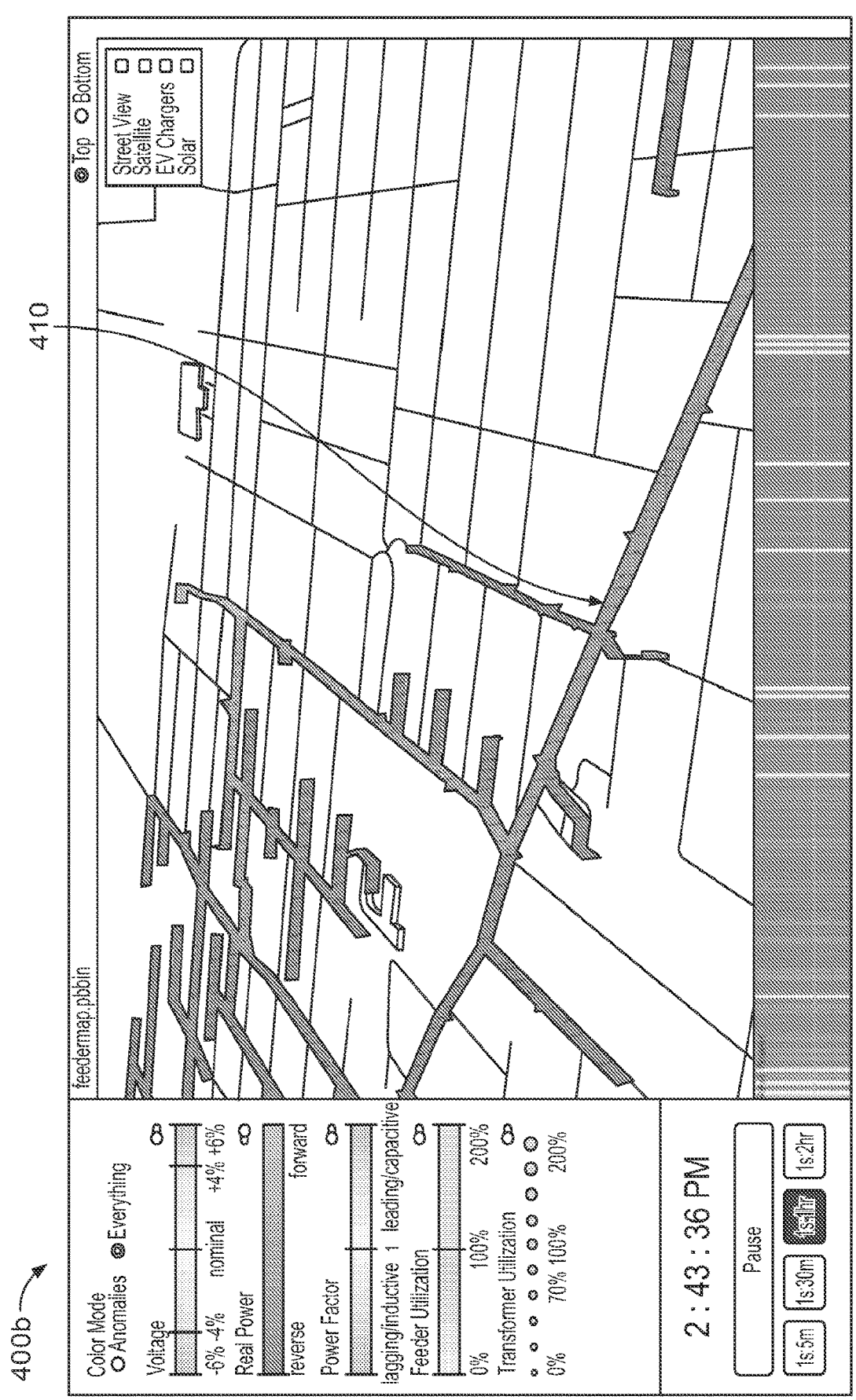

FIGS. 4A and 4B illustrate example user interfaces 400a and 400b, respectively ("user interfaces 400"), with line segment attributes representing real power flow. In the user interfaces 400, magnitude and direction of power flow are represented by time-changing directional arrows on each line segment. A direction of power flow is represented by an orientation of arrows on the line segment. The time-changing arrows progress along each line segment in the direction of power flow. A relative rate of power flow is represented by a speed of movement of arrows along the line segment. For example, lower rates of power flow are represented by slower speeds, while higher rates of power flow are represented by faster speeds.

Additionally, in the user interfaces 400, power is represented by color shading of the line segments. Darker shading represents higher rates of power flow, while lighter shading represents lower rates of power flow.

FIG. 4A illustrates the example user interface 400a with line segment attributes representing power flow at a first time. The user interface 400a includes an arrow 410 at a first position on a line segment.

FIG. 4B illustrates the example user interface 400b with line segment attributes representing power flow at a second time that is later than the first time. The user interface 400b includes the arrow 410 at a position on the line segment that is a second position that is different than the first position. The speed of movement of the arrow 410 represents a relative rate of power flow between the first position and the second position. The orientation and direction of movement of the arrow 410 represents the direction of power flow of the power grid.

Figure 5A:
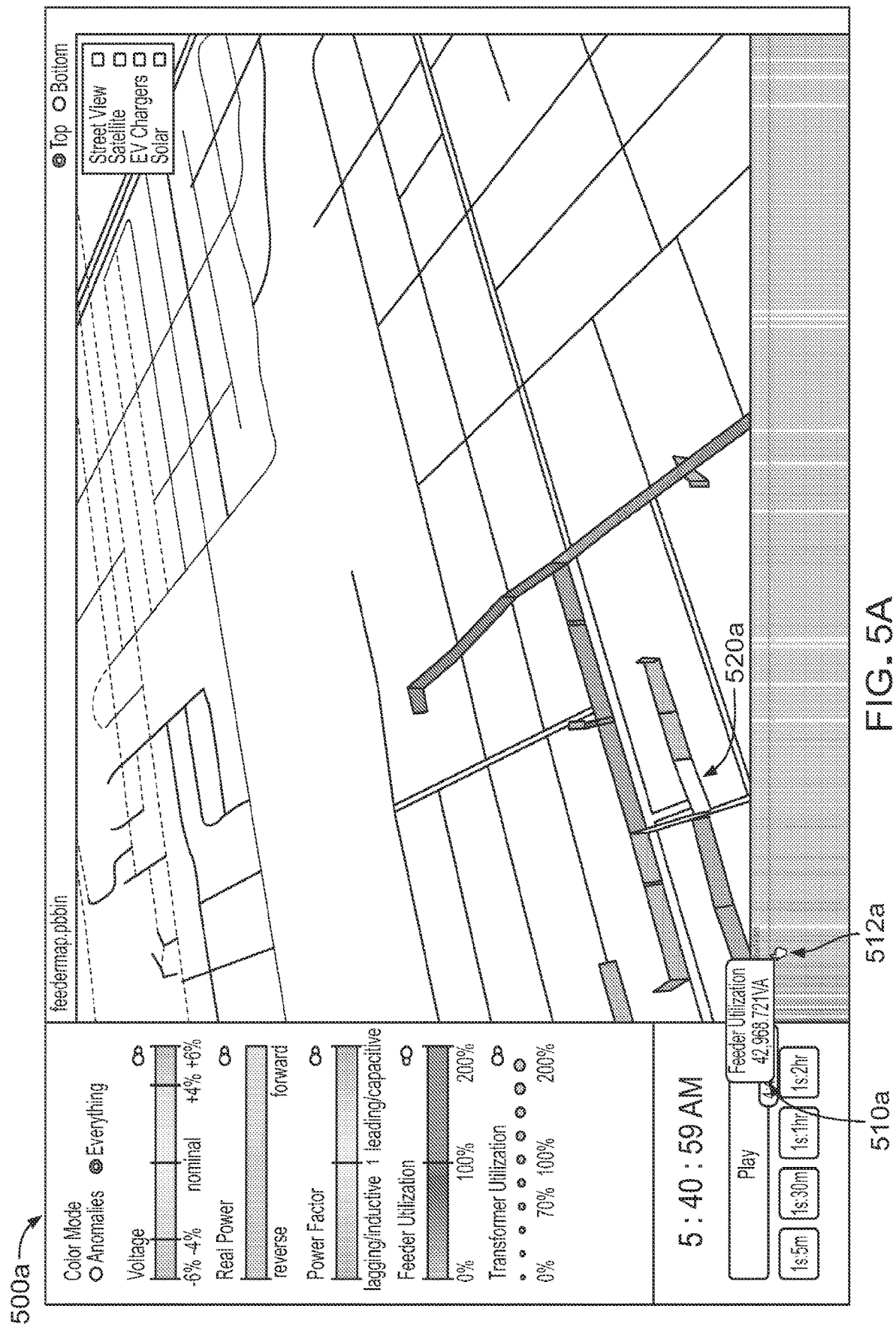
FIGS. 5A, 5B, and 5C illustrate example user interfaces with line segment attributes representing asset utilization.
Figure 5B:
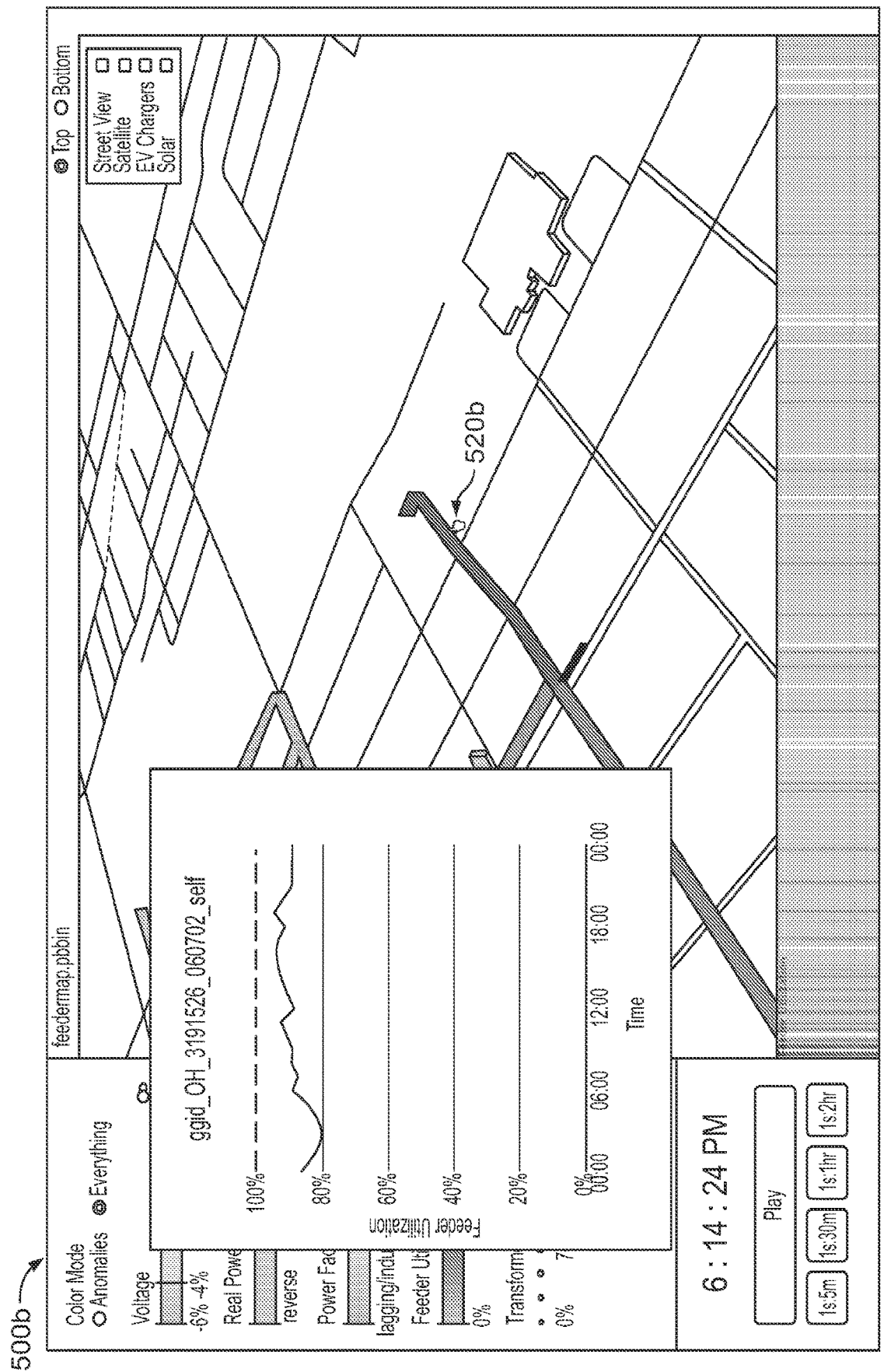
Figure 5C:
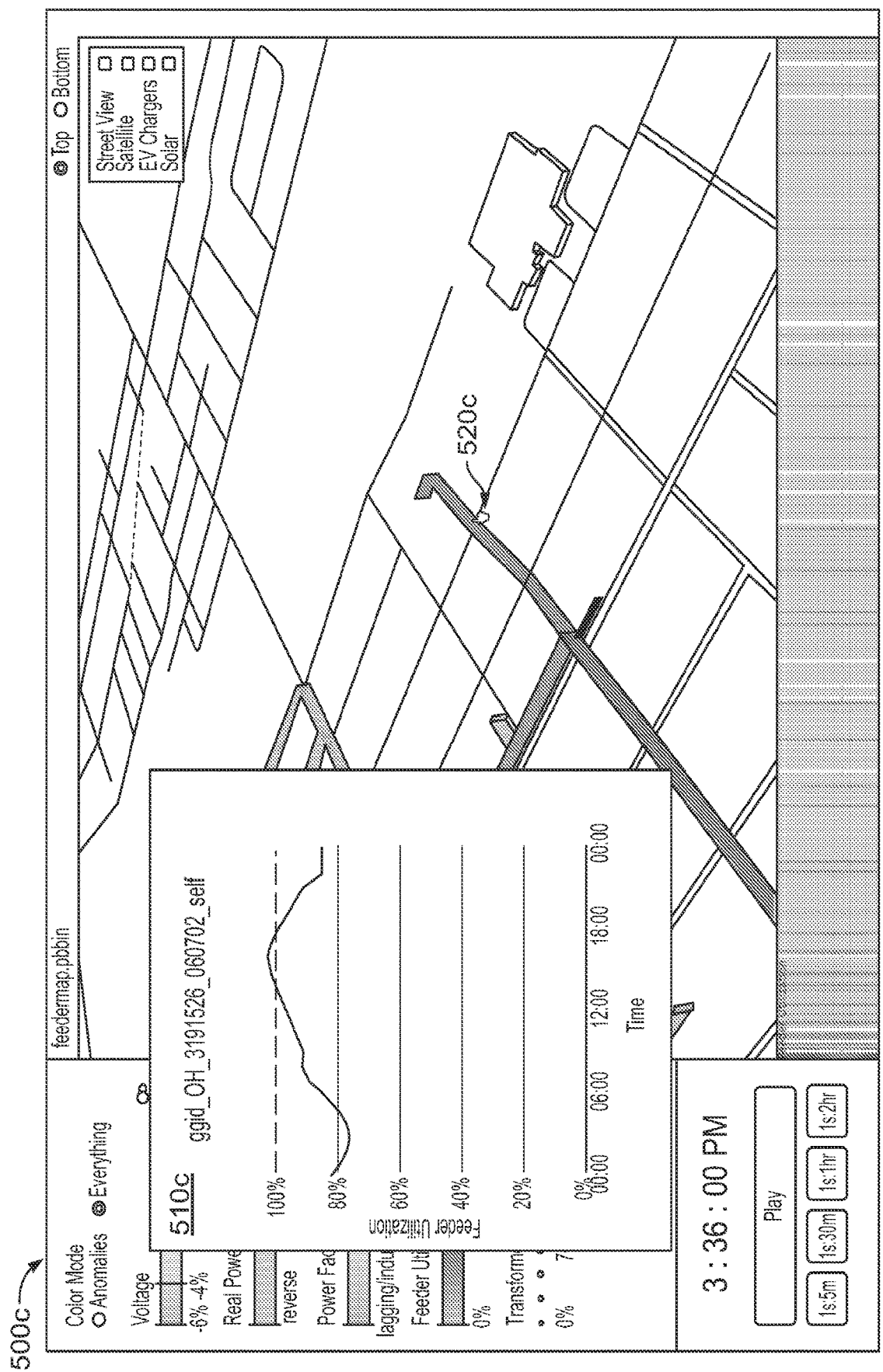

In some examples, the user interface can display line segments representing utilization of assets such as transmission lines. For example, FIGS. 5A, 5B, and 5C illustrate example user interfaces 500a, 500b, and 500c, respectively ("user interfaces 500"), each with line segment attributes representing relative feeder utilization. The user interfaces 500 show utilization of feeder lines relative to their ratings as a color gradient of the line segments. Utilizations that are lower compared to ratings are more lightly shaded, while utilizations that are higher compared to ratings are more darkly shaded.

FIG. 5A illustrates the example user interface 500a with line segment attributes representing feeder line utilization, with detailed information shown for a selected time and location. In the user interface 500a, a user has selected a point 512a on a graph in the second window 120 using a cursor. The selected point 512a corresponds to a value of feeder utilization at a location 520a, at a particular time. In response to the user selecting the point 512a, the user interface 500a shows detailed information 510a in the second window 120. The detailed information 510a includes the feeder utilization at the location 520a at the particular time. Additionally, in response to the user selecting the point 512a, the user interface 500a highlights a line segment in the first window 110 corresponding to the location 520a.

FIG. 5B illustrates the example user interface 500b with line segment attributes representing feeder utilization, with a detailed utilization graph shown for a selected location, showing utilization remaining less than feeder capacity. In the user interface 500b, a user has selected the location 520b within the first window 110, using a cursor. The line segment at the location 520b has a light color shading, representing low levels of utilization. In response to the user selecting the location 520b, the user interface 500b shows the feeder utilization graph 510b. The feeder utilization graph 510b shows feeder utilization at the location 520b graphed over a period of 24 hours. The feeder utilization graph 510b shows the feeder utilization remaining below 100% feeder capacity.

FIG. 5C illustrates the example user interface 500c with line segment attributes representing feeder utilization, with a detailed utilization graph shown for a location, showing utilization exceeding feeder capacity. In the user interface 500c, a user has selected the location 520c within the first window 110, using a cursor. The line segment at the location 520c has a dark color shading, representing high levels of utilization. In response to the user selecting the location 520c, the user interface 500c shows the feeder utilization graph 510c. The feeder utilization graph 510c shows feeder utilization at the location 520c graphed over a period of 24 hours. The feeder utilization graph 510c shows the feeder utilization exceeding 100% feeder capacity between approximately 14:00 and 16:00 hours.

Figure 6A:
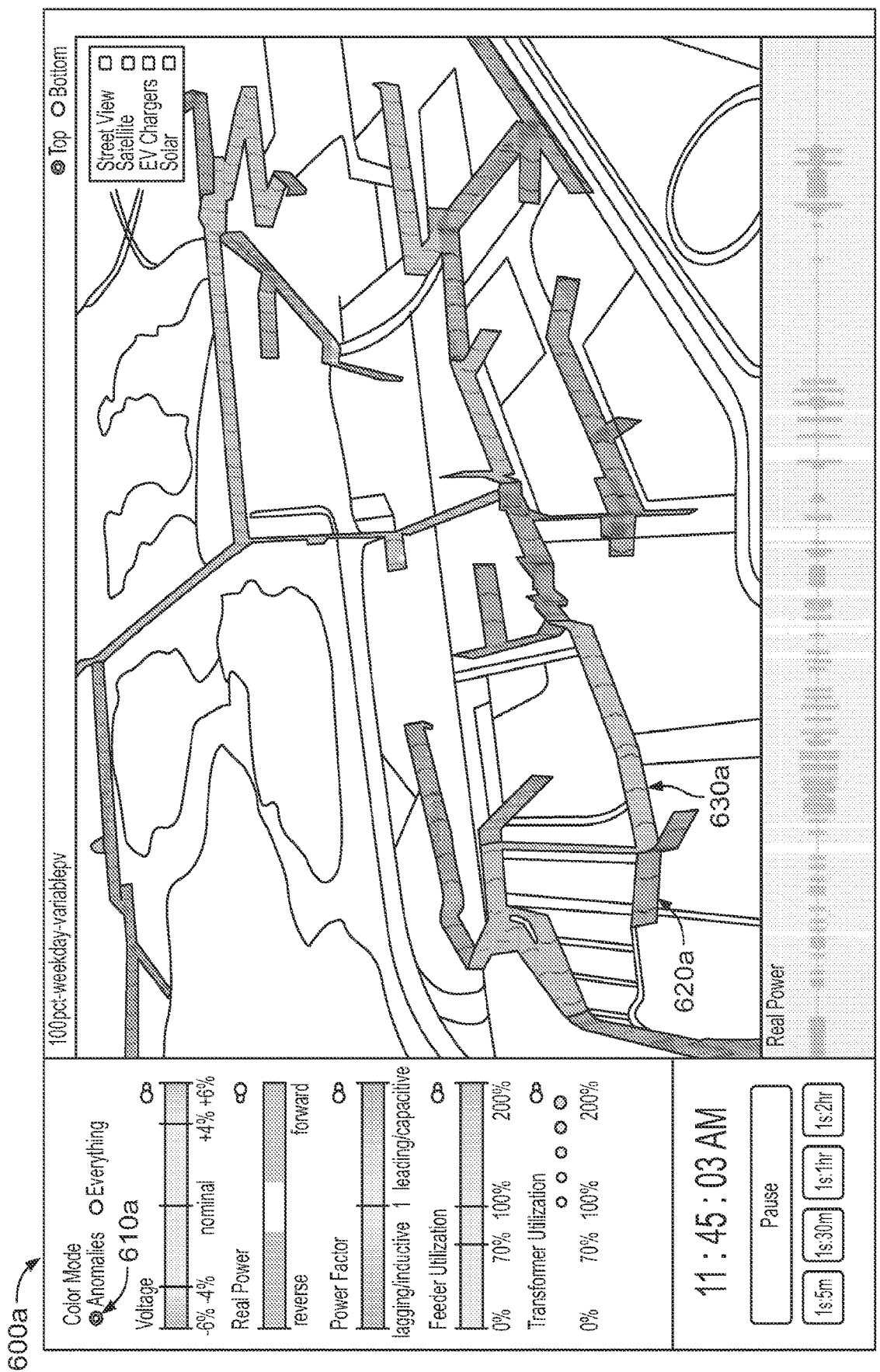
FIGS. 6A, 6B, and 6C illustrate example user interfaces with line segment attributes representing power flow, including an anomaly view and a comparison view.
Figure 6B:
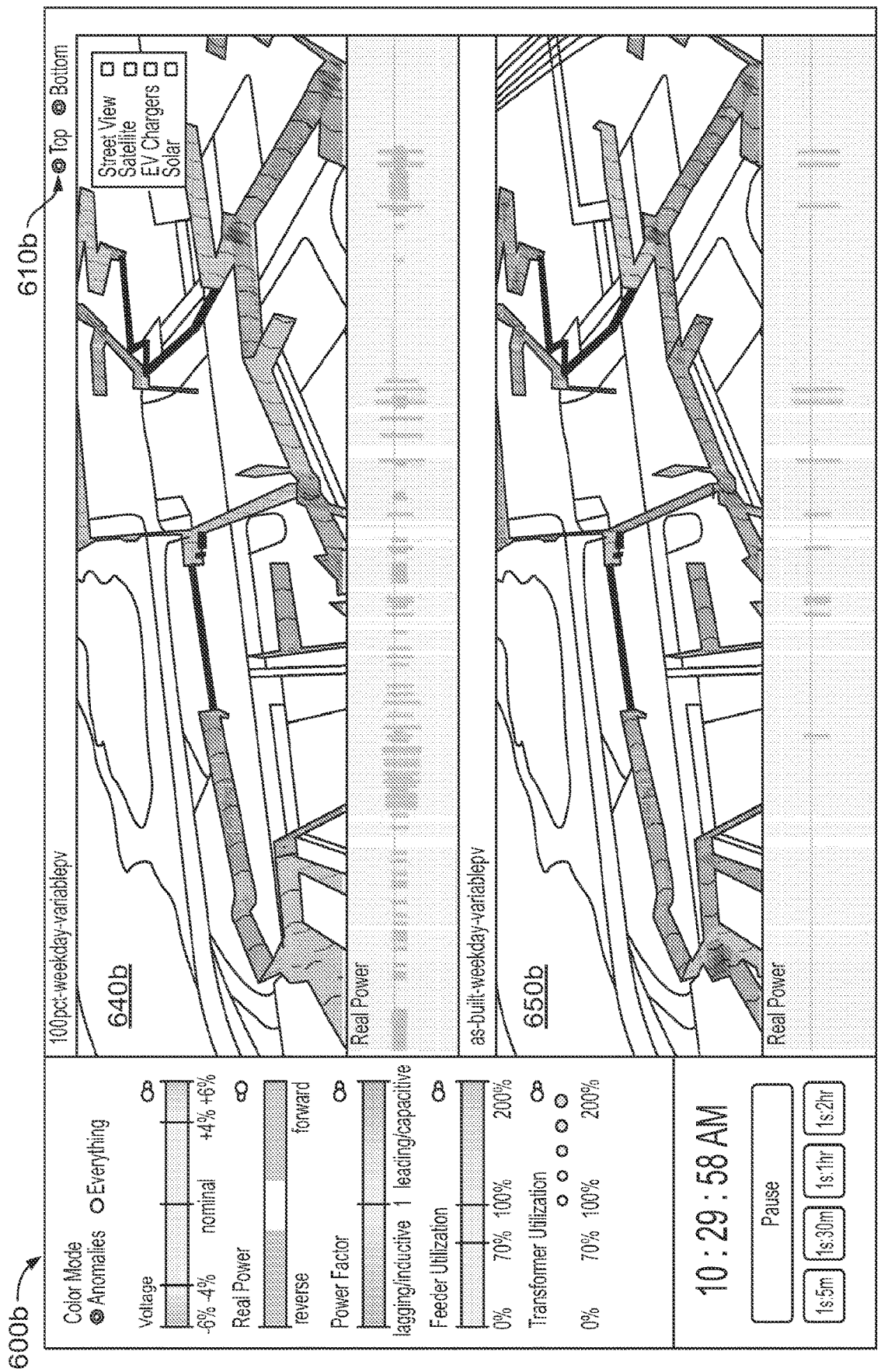
Figure 6C:
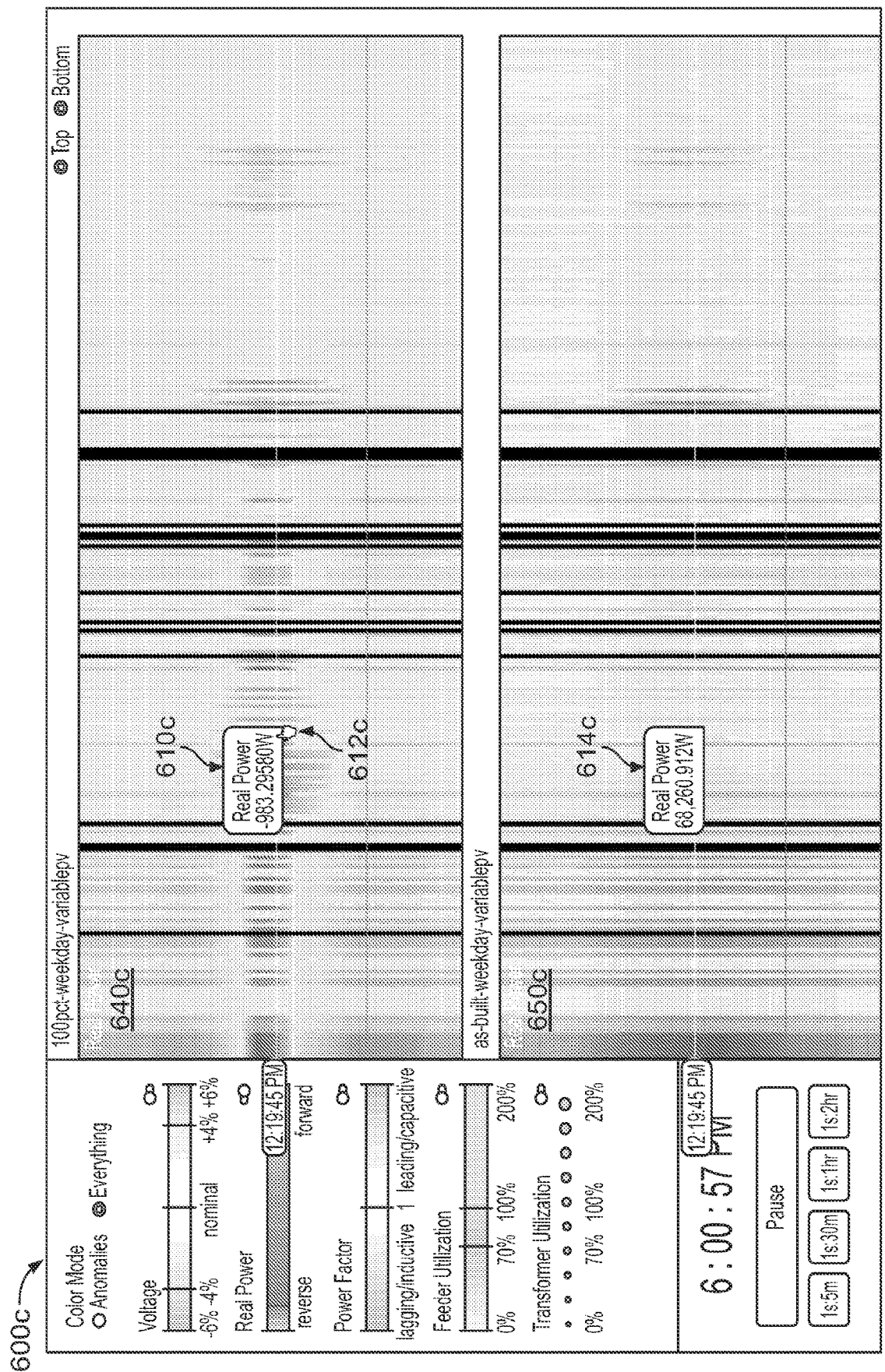

FIGS. 6A, 6B, and 6C illustrate example user interfaces 600a, 600b, and 600c, respectively ("user interfaces 600") with line segment attributes representing power flow, including an anomaly view and a comparison view. FIG. 6A illustrates the example user interface 600a with line segment attributes representing power anomalies. In the user interface 600a, relative magnitude and direction of power flow are represented by time-changing directional arrows on each line segment. Directions of real power flow and of reverse power flow are represented by two sets of arrows on line segments. A first set of arrows 620 represent real power flow, while a second set of arrows 630 represent reverse power flow. The time-changing arrows progress along each line segment in the direction of power flow. A relative magnitude of power flow is represented by a speed of movement of arrows along the line segments.

In the user interface 600a, a user has selected an anomaly view icon 610a. An anomaly view highlights characteristics as their values approach or cross pre-selected thresholds. For example, in the user interface 600a, reverse power is categorized as an anomaly. In response to the user selecting the anomaly view icon 610a, the user interface 600a shows power grid anomalies in the first window 110. For example, the user interface 600a shows anomalous reverse power flow highlighted in brighter color shades. The user interface 600a shows real power flow "greyed out," or shaded in lighter shades.

In some examples, the user interface 600a can alert a user to critical anomalies. For example, the user interface 600a can integrate a combination of visual indicators, audio indicators, and textual notifications when a limit or violation is reached.

FIG. 6B illustrates the example user interface 600b comparing power anomalies under two different sets of conditions. In the user interface 600b, a user has selected top and bottom icons 610b to open a comparison view. The comparison view displays power grid characteristics for two or more different sets of conditions.

In response to the user selecting the top and bottom icons 610b, the user interface 600b shows the first window 110 split into a top window 640b and a bottom window 650b. The top window 640b shows power anomalies under a first set of conditions, while the bottom window 650b shows power anomalies under a second set of conditions.

In some examples, the top window 640b can show actual power anomalies in the power grid, while the bottom window 650b can show simulated power anomalies in the power grid. In some examples, the top window 640b can show actual power anomalies in the power grid over a selected twenty-four hour period, while the bottom window 650b can show actual power anomalies in the power grid over a different twenty-four hour period.

In some examples, the top window 640b can show real or simulated power anomalies in the power grid without a particular asset connected to the power grid, while the bottom window 650b can show simulated power anomalies in the power grid with the particular asset connected to the power grid. For example, the user interface 600b may be used to compare potential effects of connecting a new power source to the power grid. In this example, the top window 640b can show power anomalies without the new power source connected to the power grid, while the bottom window 650b can show simulated power anomalies with the new power source connected to the power grid. In this way, the user interface 600b can be used for interconnection evaluations of new power grid assets.

FIG. 6C illustrates the example user interface 600c comparing power under two different sets of conditions. In the user interface 600c, a user has selected to expand the second window 120 to a larger size. The user interface 600c displays a "zoomed in" view of the second window 120, including a graph of power over time at locations of the power grid under the two different sets of conditions.

In the user interface 600c, the zoomed in second window 120 is split into a top window 640c and a bottom window 650c. The top window 640c shows power under a first set of conditions, while the bottom window 650c shows power under a second set of conditions. In some examples, the top window 640c can show actual power in the power grid, while the bottom window 650c can show simulated power in the power grid. In some examples, the top window 640c can show actual power in the power grid over a selected twenty-four hour period, while the bottom window 650c can show actual power in the power grid for a different twenty-four hour period. In both the top window 640c and the bottom window 650c, real power is represented by a lighter color shading, while reverse power is represented by a brighter color shading.

In the user interface 600c, the user has selected a coordinate point 612c of the graph in the top window 640c using a cursor. The selected point 612c corresponds to a power value at a location of the power grid, at a particular time. In response to the user selecting the point 612c, the user interface 600c shows detailed information 610c in the top window 640c. The detailed information 610c includes the real power at the selected location at the particular time, under the first set of conditions. The detailed information 610c shows the selected point 612c having a reverse power flow under the first set of conditions.

Additionally, in response to the user selecting the point 612c, the user interface 600c shows detailed information 614c in the bottom window 650c at the same selected location and the same time, under the second set of conditions. The detailed information 614c shows the selected point 612c having a real power flow under the second set of conditions.

Though the user interfaces 600b and 600c show comparisons between two different sets of conditions, the computing system can run simulations with multiple comparisons. In some examples, the computing system can run many simulations of different sets of conditions, and can display a selection of the simulation results in a comparison view.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a handheld device such as a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors, the method comprising:
    obtaining, by the one or more processors, power grid data comprising a plurality of different temporal and spatially dependent characteristics of a power grid, the characteristics including a first characteristic, a second characteristic, and a third characteristic;
    generating, by the one or more processors, rendering data that, when rendered for display, presents a graphical user interface (GUI) representing a visualization of the power grid data, the GUI comprising:
        a first window that includes a line-diagram representation of power lines in the power grid overlaid on a map of a geographic region in which the power grid is located, the line-diagram comprising a plurality of line segments, wherein attributes of each line segment represent the power grid data at a particular spatial location of the power grid, the attributes comprising:
            a time-changing thickness of the line segment representing the first characteristic at the particular spatial location of the power grid;
            a plurality of time-changing directional arrows on the line segment representing the second characteristic; and
            a color shading of the line segment representing the third characteristic;
        a second window that includes at least one graph representing values of a characteristic of the power grid over time and space, wherein each value is represented by respective coordinates on the at least one graph and a shade, wherein for each value of the characteristic an x-coordinate represents a distance of the value from a reference point in the power grid, a y-coordinate represents a time of the value, and the shade of the value represents a magnitude of the value; and
        a third window that includes a menu comprising user-selectable icons that permit toggling representation of different characteristics of the power grid on and off within the first window, the second window, or both;
    receiving, by the one or more processors, data indicating a user selection of a user-selectable icon included in the menu of the third window, wherein the user-selectable icon corresponds to a particular characteristic; and
    in response to receiving the data indicating the user selection of the user-selectable icon, toggling, by the one or more processors, representation of the particular characteristic on or off within the first window, the second window, or both.

2. The method of claim 1, wherein the first characteristic of the power grid comprises power flow, and the plurality of time-changing directional arrows on the line segment represent a power magnitude and direction of power flow.

3. The method of claim 2, wherein power flow comprises real power flow and reverse power flow.

4. The method of claim 1, wherein the second characteristic of the power grid comprises voltage, and the time-changing thickness of the line segment represents a voltage magnitude at the particular spatial location of the power grid.

5. The method of claim 1, wherein the menu includes a second user-selectable icon that permits changing an aspect of the first window and the second window to present an anomaly view, wherein attributes of each line segment represent whether the power grid data has crossed a threshold at a particular spatial location of the power grid.

6. The method of claim 1, wherein the menu includes one or more user-selectable icons that permit changing an aspect of GUI to present a comparison view, wherein the comparison view comprises:
    a top window that includes a first line-diagram representation of power lines in the power grid, and a first graph representing values of a characteristic of the power grid over time and space, under a first set of conditions; and
    a bottom window that includes a second line-diagram representation of power lines in the power grid, and a second graph representing values of the characteristic of the power grid over time and space, under a second set of conditions.

7. The method of claim 1, wherein:
    the GUI comprises one or more user-selectable icons that permit selecting the map in the first window; and
    the map comprises one or more of a topological map, a street-view map, an aerial map, or a satellite map.

8. The method of claim 1, wherein in response to a user selecting a coordinate in the second window, the GUI highlights a line segment at a corresponding spatial location in the first window.

9. The method of claim 1, wherein in response to a user selecting a coordinate in the second window, the GUI displays the magnitude of a corresponding characteristic value.

10. The method of claim 1, wherein in response to a user selecting a spatial location in the first window, the GUI displays power grid data at the spatial location graphed over a period of time.

11. The method of claim 1, wherein the third characteristic comprises one or more of power factor, feeder utilization, or transformer utilization.

12. A system comprising one or more processors and one or more storage devices on which are stored instructions that are operable, when executed by the one or more processors, to cause the one or more processors to perform operations comprising:
- obtaining, by the one or more processors, power grid data comprising a plurality of different temporal and spatially dependent characteristics of a power grid, the characteristics including a first characteristic, a second characteristic, and a third characteristic; and
- generating, by the one or more processors, rendering data that, when rendered for display, presents a graphical user interface (GUI) representing a visualization of the power grid data, the GUI comprising:
  - a first window that includes a line-diagram representation of power lines in the power grid overlaid on a map of a geographic region in which the power grid is located, the line-diagram comprising a plurality of line segments, wherein attributes of each line segment represent the power grid data at a particular spatial location of the power grid, the attributes comprising:
    - a time-changing thickness of the line segment representing the first characteristic at the particular spatial location of the power grid;
    - a plurality of time-changing directional arrows on the line segment representing the second characteristic; and
    - a color shading of the line segment representing the third characteristic;
  - a second window that includes at least one graph representing values of a characteristic of the power grid over time and space, wherein each value is represented by respective coordinates on the at least one graph and a shade, wherein for each value of the characteristic an x-coordinate represents a distance of the value from a reference point in the power grid, a y-coordinate represents a time of the value, and the shade of the value represents a magnitude of the value; and
  - a third window that includes a menu comprising user-selectable icons that permit toggling representation of different characteristics of the power grid on and off within the first window, the second window, or both;
- receiving, by the one or more processors, data indicating a user selection of a user-selectable icon included in the menu of the third window, wherein the user-selectable icon corresponds to a particular characteristic; and
- in response to receiving the data indicating the user selection of the user-selectable icon, toggling, by the one or more processors, representation of the particular characteristic on or off within the first window, the second window, or both.

13. The system of claim 12, wherein the first characteristic of the power grid comprises power flow, and the plurality of time-changing directional arrows on the line segment represent a power magnitude and direction of power flow.

14. The system of claim 13, wherein power flow comprises real power flow and reverse power flow.

15. The system of claim 12, wherein the second characteristic of the power grid comprises voltage, and the time-changing thickness of the line segment represents a voltage magnitude at the particular spatial location of the power grid.

16. The system of claim 12, wherein the menu includes a second user-selectable icon that permits changing an aspect of the first window and the second window to present an anomaly view, wherein attributes of each line segment represent whether the power grid data has crossed a threshold at a particular spatial location of the power grid.

17. The system of claim 12, wherein the menu includes one or more user-selectable icons that permit changing an aspect of GUI to present a comparison view, wherein the comparison view comprises:
- a top window that includes a first line-diagram representation of power lines in the power grid, and a first graph representing values of a characteristic of the power grid over time and space, under a first set of conditions; and
- a bottom window that includes a second line-diagram representation of power lines in the power grid, and a second graph representing values of the characteristic of the power grid over time and space, under a second set of conditions.

18. The system of claim 12, wherein:
- the GUI comprises one or more user-selectable icons that permit selecting the map in the first window; and
- the map comprises one or more of a topological map, a street-view map, an aerial map, or a satellite map.

19. The system of claim 12, wherein in response to a user selecting a coordinate in the second window, the GUI highlights a line segment at a corresponding spatial location in the first window.

20. A non-transitory computer storage medium encoded with instructions that, when executed by one or more processors, cause the one or more processors to perform operations comprising:
- obtaining, by the one or more processors, power grid data comprising a plurality of different temporal and spatially dependent characteristics of a power grid, the characteristics including a first characteristic, a second characteristic, and a third characteristic; and
- generating, by the one or more processors, rendering data that, when rendered for display, presents a graphical user interface (GUI) representing a visualization of the power grid data, the GUI comprising:
  - a first window that includes a line-diagram representation of power lines in the power grid overlaid on a map of a geographic region in which the power grid is located, the line-diagram comprising a plurality of line segments, wherein attributes of each line segment represent the power grid data at a particular spatial location of the power grid, the attributes comprising:
    - a time-changing thickness of the line segment representing the first characteristic at the particular spatial location of the power grid;
    - a plurality of time-changing directional arrows on the line segment representing the second characteristic; and
    - a color shading of the line segment representing the third characteristic;
  - a second window that includes at least one graph representing values of a characteristic of the power grid over time and space, wherein each value is represented by respective coordinates on the at least one graph and a shade, wherein for each value of the characteristic an x-coordinate represents a distance of the value from a reference point in the power grid, a y-coordinate represents a time of the value, and the shade of the value represents a magnitude of the value; and a third window that includes a menu comprising user-selectable icons that permit toggling representation of different characteristics of the power grid on and off within the first window, the second window, or both;

receiving, by the one or more processors, data indicating a user selection of a user-selectable icon included in the menu of the third window, wherein the user-selectable icon corresponds to a particular characteristic; and in response to receiving the data indicating the user selection of the user-selectable icon, toggling, by the one or more processors, representation of the particular characteristic on or off within the first window, the second window, or both.

\* \* \* \* \*